(12) United States Patent
Han et al.

(10) Patent No.: US 7,931,874 B2
(45) Date of Patent: Apr. 26, 2011

(54) THREE-LAYERED CATALYST SYSTEM FOR PURIFYING EXHAUST GASES OF INTERNAL ENGINES

(75) Inventors: Hyun-Sik Han, Ansan (KR); Tae-Woo Lee, Ansan (KR); Eun-Seok Kim, Ansan (KR)

(73) Assignee: Heesung Catalysts Corporation, Shiheung, Kyungki-do (KR)

( * ) Notice: Subject to any disclaimer, the term of this patent is extended or adjusted under 35 U.S.C. 154(b) by 878 days.

(21) Appl. No.: 11/895,511

(22) Filed: Aug. 24, 2007

(65) Prior Publication Data

US 2008/0047261 A1 Feb. 28, 2008

(30) Foreign Application Priority Data

Aug. 28, 2006 (KR) .......................... 10-2006-0081656

(51) Int. Cl.
*B01D 50/00* (2006.01)
*B01J 23/40* (2006.01)
*B32B 15/00* (2006.01)

(52) U.S. Cl. ........ 422/177; 502/302; 502/304; 502/326; 502/349; 502/514; 502/339; 428/668

(58) Field of Classification Search ............... 423/239.1, 423/244.02, 213.5; 502/302, 304, 326, 332, 502/349, 514, 527.2, 339; 422/171, 177; 428/668

See application file for complete search history.

(56) References Cited

U.S. PATENT DOCUMENTS

| | | | | |
|---|---|---|---|---|
| 4,857,499 A | * | 8/1989 | Ito et al. | 502/326 |
| 5,057,483 A | * | 10/1991 | Wan | 502/304 |
| 5,427,989 A | * | 6/1995 | Kanesaka et al. | 502/66 |
| 5,948,723 A | * | 9/1999 | Sung | 502/303 |
| 5,989,507 A | * | 11/1999 | Sung et al. | 423/213.5 |
| 6,074,973 A | | 6/2000 | Lampert et al. | 502/60 |
| 6,294,140 B1 | * | 9/2001 | Mussmann et al. | 423/213.5 |
| 6,348,430 B1 | * | 2/2002 | Lindner et al. | 502/304 |
| 6,617,276 B1 | * | 9/2003 | Ballinger et al. | 502/66 |
| 6,764,665 B2 | * | 7/2004 | Deeba et al. | 423/239.1 |
| 6,956,008 B2 | * | 10/2005 | Takeshima et al. | 502/326 |
| 7,276,212 B2 | * | 10/2007 | Hu et al. | 422/177 |
| 7,749,472 B2 | * | 7/2010 | Chen et al. | 423/213.2 |
| 2001/0006934 A1 | | 7/2001 | Kachi et al. | 502/325 |

* cited by examiner

*Primary Examiner* — N. Bhat
(74) *Attorney, Agent, or Firm* — Ohlandt, Greeley, Ruggiero & Perle, L.L.P.

(57) ABSTRACT

Herein is a three-layered catalyst system in which layers including predetermined precious metal components are sequentially layered on a substrate, and thus the conversion ratio of HC and CO is increased, thereby improving purification efficiency. The three-layered catalyst system includes a substrate, a lower layer containing a precious metal component of only platinum, an intermediate layer containing a precious metal component of only palladium, and an upper layer containing a precious metal component of only platinum, all of which are sequentially layered.

3 Claims, 9 Drawing Sheets

Substrate

THREE-LAYERED CATALYST SYSTEM FOR PURIFYING EXHAUST GASES OF INTERNAL ENGINES

BACKGROUND OF THE INVENTION

1. Field of the Invention

The present invention relates to a three-layered catalyst system and, more particularly, to a three-layered catalyst system for purifying the exhaust gases discharged from internal combustion engines, in which a lower layer, including platinum or a platinum-rich precious metal component, an intermediate layer, including palladium or a palladium-rich precious metal component, and an upper layer, including platinum or a platinum-rich precious metal component, are sequentially layered on a substrate.

2. Description of the Related Art

Typical examples of exhaust gases discharged from transportation means, such as automobiles and the like, include hydrocarbons (HC), ozone ($O_3$), particulate matter (PM), nitrogen oxides (NOx), carbon monoxide (CO), and sulfur dioxide ($SO_2$). Since these harmful materials cause primary pollution, in which harmful gases are directly emitted in the atmosphere, and secondary pollution, in which exhaust gases chemically react with each other in the atmosphere and thus harmful gases are secondarily generated, the seriousness thereof is increasing day by day. The test modes for evaluating exhaust gases discharged from automobiles used worldwide are classified into American type test mode and European type test mode. Korea has applied the FTP-75 mode, which is the American type test mode, to automobiles, passenger cars, and small freight vehicles.

The FTP-75 mode is a system for evaluating the amount of constituents of exhaust gases discharged from automobiles when the automobiles are running in a predetermined running mode under regulated conditions, and includes a chassis dynamometer enabling the driving of automobile wheels, a sample collecting apparatus for collecting samples from exhaust gases discharged from test cars, and an exhaust gas analyzer for analyzing the collected samples. In this FTP mode, in the case of automobiles using gasoline or LPG as fuel, exhaust gases, such as HC, CO, NOx and the like, are analyzed, and, in the case of diesel automobiles, particulate matter as well as these exhaust gases can be evaluated.

The FTP-75 mode is performed through three steps. Here, a cold start phase, which is the first step, is performed during the period from 0 to 505 seconds, a cold start transient phase, which is the second step, is performed during the period from 505 to 1369 seconds, and a hot start phase, which is the third step, is performed for during the period from 0 to 505 seconds. According to the results of evaluation of the amount of harmful materials of exhaust gases depending on the types of cars, which were announced by the Government for the year 1998, it was reported that, in the case of automobiles using gasoline or LPG as fuel, the ratio of NOx is 15.5, PM 1.5, CO 52.1, and HC 56.6, in the case of buses, the ratio of NOx is 20.7, PM 24.4, CO 11.1, and HC 9.8, and, in the case of trucks, the ratio of NOx is 63.8, PM 74.1, CO 36.8, and HC 33.6. As noted in the report, in the case of the automobiles using gasoline or LPG as fuel, accounting for 68.8% of all types of vehicles, hydrocarbons (HC) are discharged the most.

Hydrocarbons cause primary pollution in that they are discharged in a state in which no fuel is combusted and secondary pollution in that they are mixed with nitrogen oxides (NOx), which are other harmful gases, and thus photochemical smog is produced by intensive sunlight.

Most of these hydrocarbons are discharged in a cold start phase during the period from 0 to 505 seconds after starting, that is, before a catalyst can operate. Therefore, hydrocarbons are first excessively discharged as soon as the engine is started.

As a method of evaluating a catalytic converter, which can reflect the characteristics of the cold start phase, a method of measuring light-off temperature (LOT), which is the temperature at which the catalyst reaches a predetermined activity, is used. However, in the method, the LOT is slowly increased, but the LOT is rapidly increased in real cars. Therefore, in order to make up for the discrepancy in the rate of LOT increase, a fast light-off test (FLOT) is used as a method of effectively evaluating the performance of a catalytic converter including a catalyst itself in consideration of rapid temperature increase at the time of engine starting. The fast light-off test (FLOT) is a method of accelerating the rapid temperature increase in real cars at the time of engine starting and measuring the performance of a catalytic converter, including a catalyst itself, depending on times.

The performance of a catalytic converter is represented by the time (time 50) at which the conversion ratio of HC, CO, and NOx is 50%. Therefore, the time at which the temperature of the catalytic converter reaches the temperature at which the catalytic converter is operable is a function of variables, such as the length of an exhaust pipe, the cell density of a support, the type of catalyst, the shape of the catalytic converter, and the like, and becomes an eigenvalue.

Examples of conventional automobile exhaust gas reducing apparatuses include a two-catalyst system and a purifying apparatus including a high heat-resistance catalyst. In the two-catalyst system, a catalyst is additionally mounted at a location adjacent to an engine, and the added catalyst is small in size and is located at the location adjacent to the engine, thus rapidly increasing purification efficiency immediately after the engine is started. Further, in the purifying apparatus including a high heat-resistance catalyst, since the high heat-resistance catalyst must be mounted at the location near the engine in order to increase purification efficiency rapidly, a thermally-durable catalyst, which can stand the high temperature of the engine, is used. As the catalyst, a precious metal selected from the group consisting of platinum (Pt), palladium (Pd) and rhodium (Rh) is used.

Based on the concept of the purifying apparatus, a conventional catalyst system for purifying exhaust gases has been advanced. Specifically, in the conventional catalyst system, a two-catalyst system is mounted on a ceramic substrate and a hydrocarbon adsorbing layer is additionally placed beneath the two-catalyst system. Referring to the operating principle of the convention catalyst system, first, the hydrocarbon adsorbing layer adsorbs hydrocarbons excessively discharged in a cold start phase, the adsorbed hydrocarbon is desorbed when the temperature at which a catalyst can be operated is reached, and then the desorbed hydrocarbons are removed by the catalyst.

However, a conventional catalyst composition for adsorbing hydrocarbons is disadvantageous in that the initial adsorption rate of hydrocarbons is low, and the hydrocarbons are desorbed before the time at which the catalyst can be operated is reached, thus decreasing the efficiency thereof (U.S. Pat. No. 6,074,973). Therefore, the catalyst composition for adsorbing hydrocarbons must have properties such that the efficiency of adsorbing excessively-discharged hydrocarbons must be high, and the desorption temperature of hydrocarbons must also be high, so as to maintain the hydrocarbons in an adsorbed state until the temperature at which the catalyst can be operated is reached.

In order to decrease the amount of hydrocarbons discharged from automobiles, various attempts have been made to maximally adsorb hydrocarbons discharged in a cold start phase and to develop a catalyst composition having a high desorption temperature. As an example of these attempts, U.S. Patent Application Publication No. 2001-0006934 discloses a catalytic converter having a multilayered catalyst system, in which a catalyst system and a hydrocarbon adsorbing layer are multi-layered on a ceramic substrate. However, the catalytic converter disclosed in this patent document has a problem in that, since hydrocarbons adsorbed at a low temperature are desorbed at an extremely low temperature, the hydrocarbons are discharged outside before they are oxidized at a high temperature.

Thus, the present inventors have made efforts to develop a highly efficient catalyst composition for adsorbing hydrocarbons. As a result, the present inventors produced a catalyst composition for adsorbing hydrocarbons including 1) a hydrocarbon adsorbing layer, formed of zeolite, applied on a substrate and 2) a two-catalyst system applied on the hydrocarbon adsorbing layer, in which the hydrocarbon adsorbing layer includes a water absorbing layer. The invention was registered as Korean Patent No. 496069.

Recently, due to efforts to improve an engine in order to decrease the amount of nitrogen oxides (NOx) included in exhaust gases discharged from automobiles, the temperature of exhaust gases has been gradually decreased, and the necessity for a catalyst composition having low activity at low temperatures has increased. FIG. 1 is a graph showing the exhaust temperatures of automobiles measured using an automobile meeting Euro-4 regulations and an automobile meeting Euro-3 regulations. In FIG. 1, it can be found that the exhaust temperatures of automobiles are gradually decreased as the regulations become strict. Here, the present inventors pay attention to the fact that the concentrations of HC and CO included in exhaust gases discharged from automobiles are increased depending on the decrease in the temperature of exhaust gases (shown in FIG. 2).

SUMMARY OF THE INVENTION

The present inventors have concentrated their efforts on the development of a novel catalyst system for preventing HC and CO, included in exhaust gases, being discharged. As a result, the present invention was completed.

Accordingly, the present invention has been made keeping in mind the above problems occurring in the prior art, and an object of the present invention is to provide a three-layered catalyst system which can improve the oxidation of hydrocarbons and carbon monoxide.

In order to accomplish the above object, the present invention provides a three-layered catalyst system for purifying exhaust gases discharged from internal combustion engines, including a substrate, a first layer having platinum or a platinum-rich precious metal component on the substrate, a second layer having palladium or a palladium-rich precious metal component on the substrate, and a third layer having platinum or a platinum-rich precious metal component on the substrate, all of which are sequentially layered.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
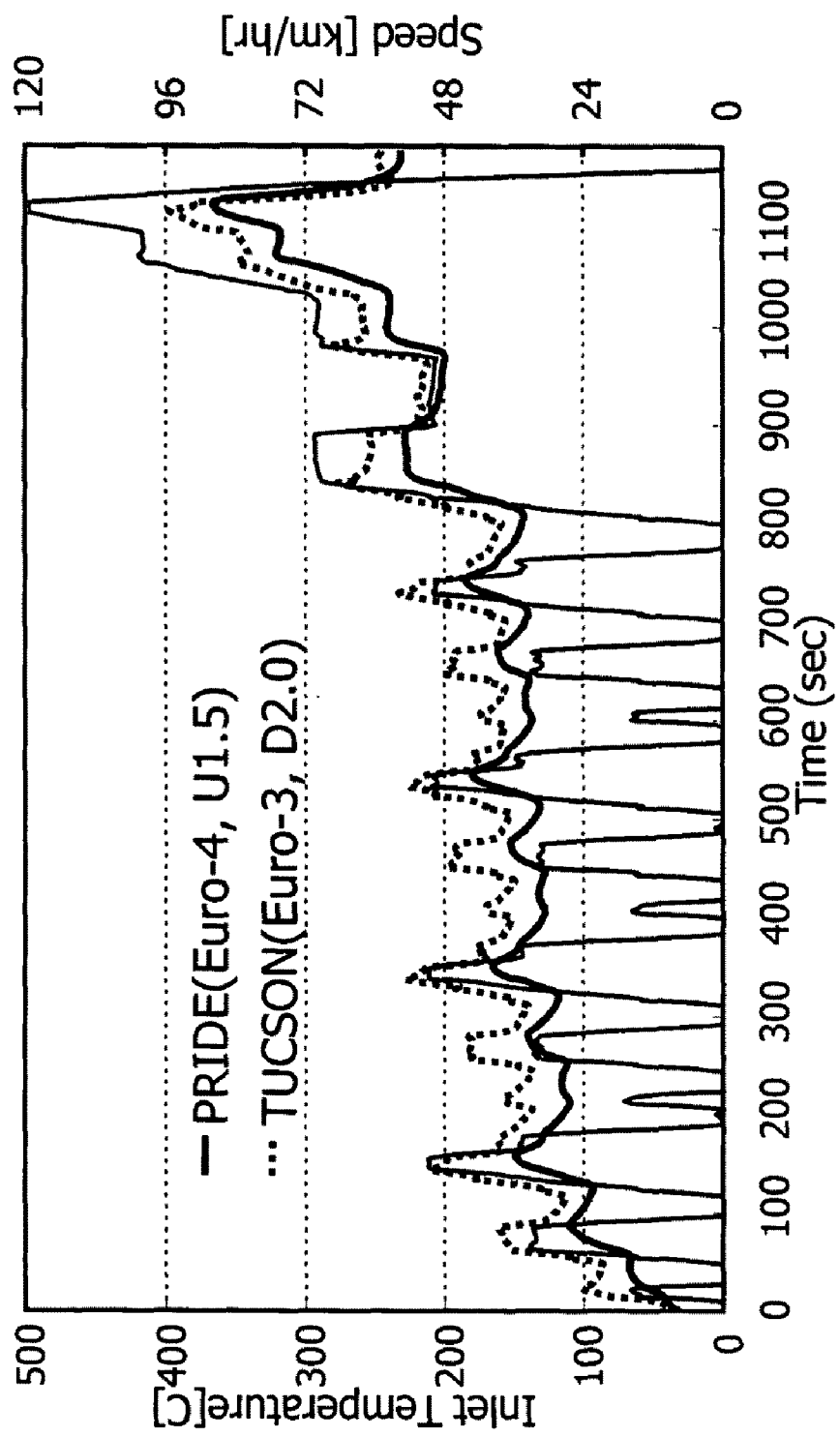
FIG. 1 is a graph showing the exhaust temperatures of automobiles measured using an automobile meeting Euro-4 regulations and an automobile meeting Euro-3 regulations.
Figure 2:
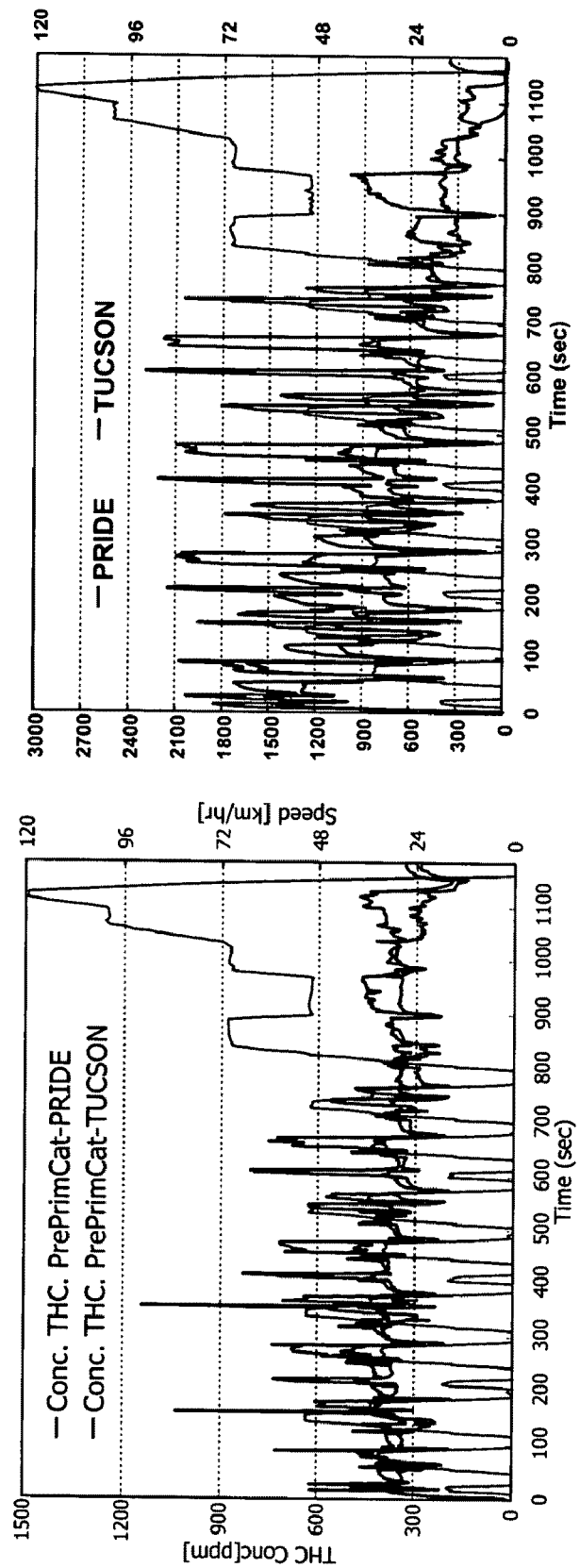
FIG. 2 is a graph showing the concentrations of HC and CO included in exhaust gases discharged from automobiles depending on the decrease in the temperature of exhaust gases.

The present invention is directed to a three-layered catalyst system which can improve the oxidation of hydrocarbons and carbon monoxide in an atmosphere of low exhaust gas temperature, and specifically provides a three-layered catalyst system for purifying exhaust gases discharged from internal combustion engines, including a substrate, a first layer having platinum or a platinum-rich precious metal component on the substrate, a second layer having palladium or a palladium-rich precious metal component on the substrate, and a third layer having platinum or a platinum-rich precious metal component on the substrate, all of which are sequentially layered. Here, the first layer means a lower layer, the second layer means an intermediate layer, and the third layer means an upper layer. The terms denoting the layers are defined in the order in which the layers are placed from the substrate.

The substrate is selected from the group consisting of cordierite, α-alumina and mullite. Preferably, cordierite may be used as the substrate.

In the three-layered catalyst system, active alumina, in which cerium-zirconium composite oxide or zirconium oxide is supported with platinum or a platinum-rich precious metal component, as a precious metal component included in the first layer, active alumina, in which cerium-zirconium composite oxide or zirconium oxide is supported with palladium or a palladium-rich precious metal component, as a precious metal component included in the second layer, and active alumina, in which cerium-zirconium composite oxide or zirconium oxide is supported with platinum or a platinum-rich precious metal component, as a precious metal component included in the third layer, are sequentially layered on the substrate.

In the specification of the present invention, the term "rich" means that 60% or more by weight of the corresponding component is included in the corresponding layer. Further, the fact that a platinum-rich component, as a precious metal component of a first layer, is supported means that 60% or more by weight of the platinum is included in the first layer.

In the case where a platinum-rich component is included in first and third layers, the only precious metal component included in the first and third layers is palladium. In the case where a palladium-rich component is included in a second layer, the only precious metal component included in the second layer is platinum.

In the catalyst system of the present invention, the total amount of platinum and palladium components added may be in a range of 40~150 g/l, and the amount of platinum is two times the amount of palladium. In the case where the first and third layers include only platinum (the second layer includes only palladium), the platinum may be distributed in the first and third layers in a ratio of 40:60 (% by weight). Further, in the case where the first, second and third layers include platinum and palladium, the platinum may be distributed in the first, second and third layers in a ratio of 30:10:60 (% by weight).

In the catalyst system of the present invention, the total amount of palladium is ½ of the total amount of platinum. In the case where the first, second and third layers include platinum and palladium, the palladium may be distributed in the first, second and third layers in a ratio of 10:80:10 (% by weight).

Hereinafter, preferred embodiments of the present invention will be described in detail with reference to the attached drawings.

Figure 3:
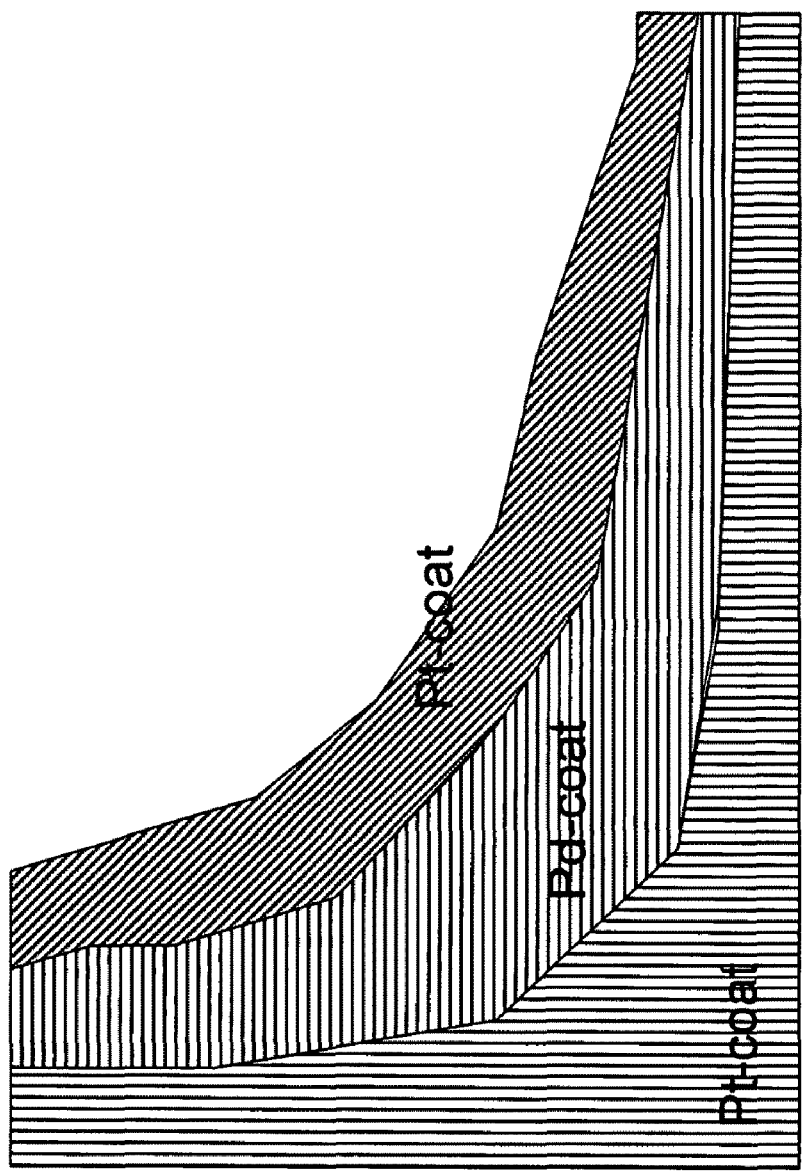
FIG. 3 is a schematic view showing a laminate structure of a three-layered catalyst system according to the present invention.

FIG. 3 is a schematic view showing a laminate structure of a three-layered catalyst system according to the present invention. Hereinafter, a procedure of designing a three-layered catalyst system, which is the technical gist of the present invention, will be described.

The present inventors have paid attention to the following experimental facts.

1) The fact that platinum and palladium have different catalytic properties from each other
 a) Platinum has an excellent conversion ratio of hydrocarbons (HC) and an excellent conversion ratio of carbon monoxide (CO) in an atmosphere of low-concentration CO, compared to palladium, and
 b) Palladium has an excellent conversion ratio of CO in an atmosphere of high-concentration CO, compared to platinum, the degree of its activity on CO can be decreased due to HC (referred to as "HC hindrance"), and palladium has relatively good thermal stability.

Figure 4:
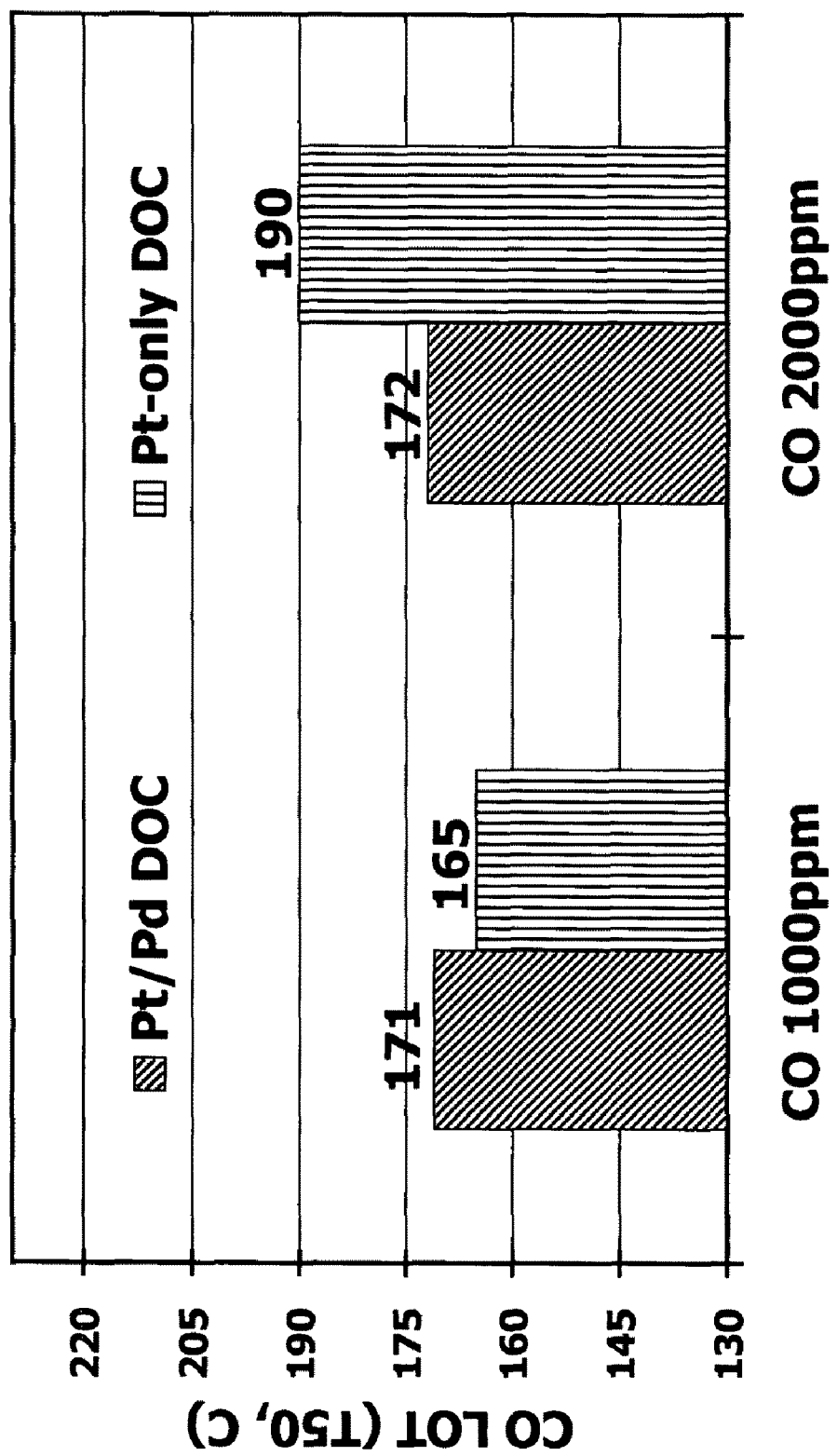
FIG. 4 is a graph showing the experimental result in which a catalyst system including only platinum has excellent CO LOT in an atmosphere of high-concentration CO, compared to a catalyst system including Pt—Pd.

2) The experimental fact that a catalyst system including only platinum has excellent CO LOT in an atmosphere of high-concentration CO, compared to a catalyst system including Pt—Pd (shown in FIG. 4)

Figure 5:
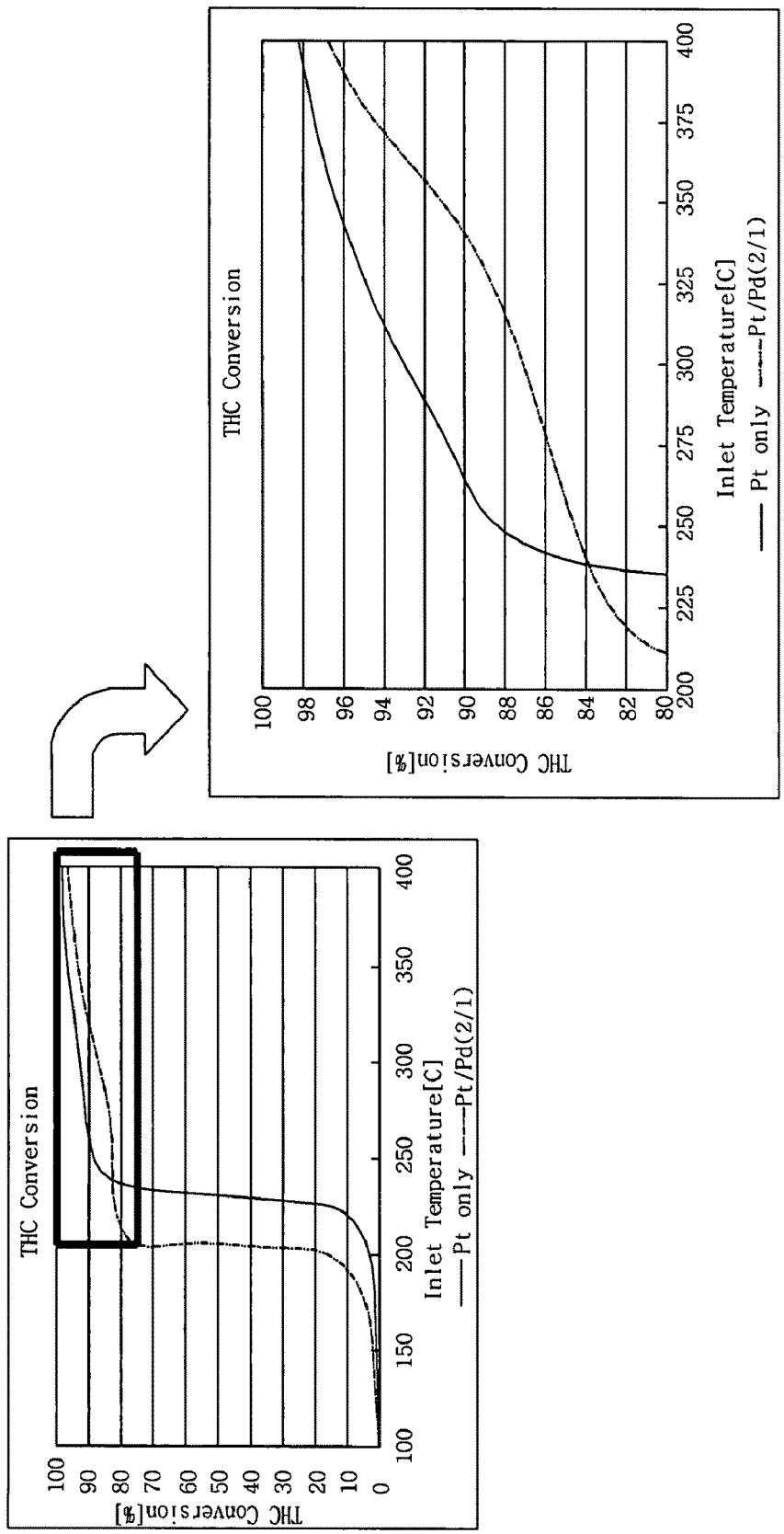
FIG. 5 is a graph showing the experimental result in which a catalyst system including only palladium has excellent oxidation of HC, compared to a catalyst system including Pt—Pd.

3) The experimental observation that a catalyst system including only palladium has excellent oxidation of HC, compared to a catalyst system including Pt—Pd (experimental condition: space velocity 50,000 l/hr; and injected gas 7000 ppm of THC, 5% of $O_2$, and balanced $N_2$) (shown in FIG. 5)

Figure 6:
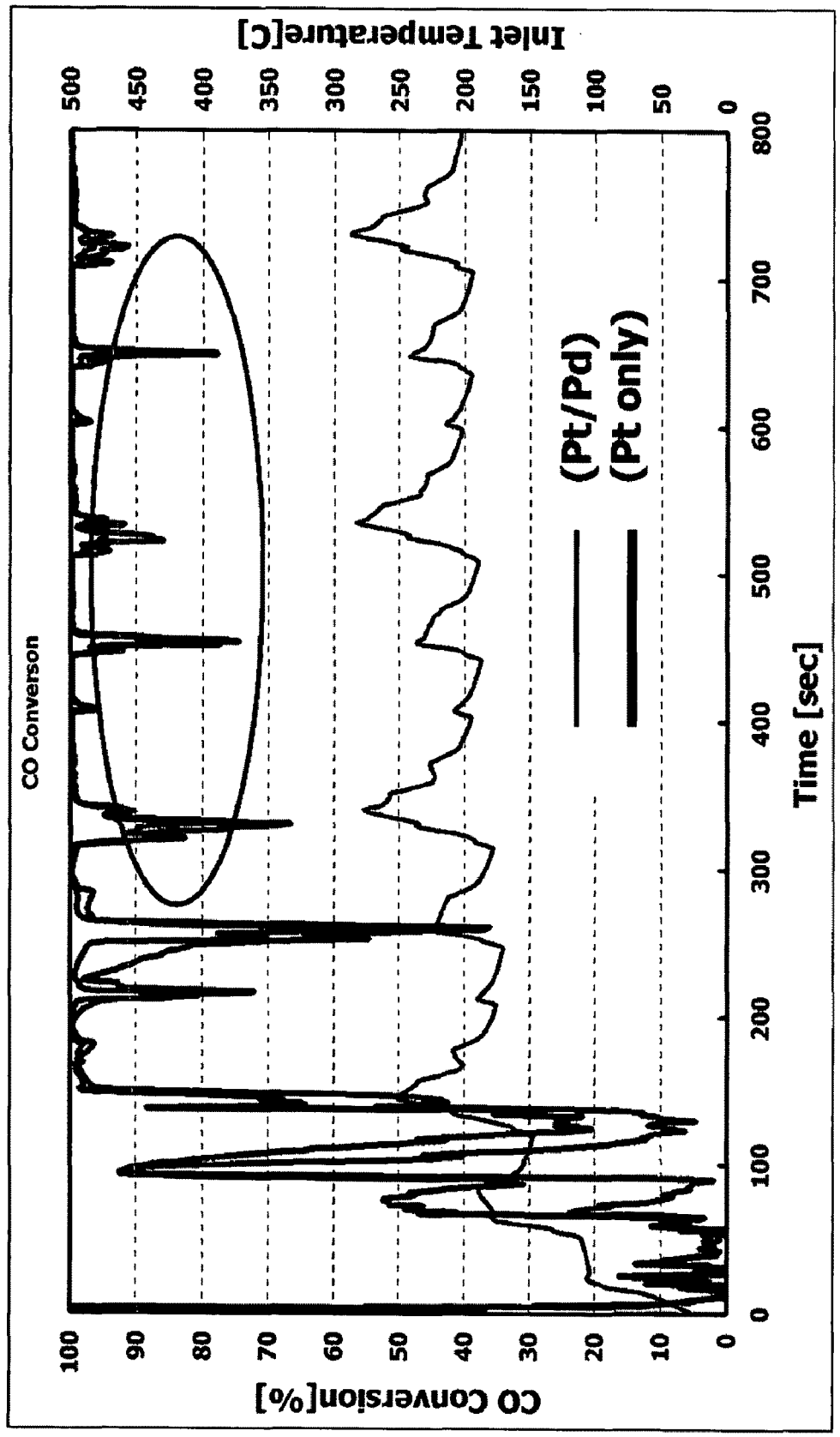
FIG. 6 is a graph showing the experimental result in which a catalyst system including only platinum has a low conversion ratio of CO in an engine acceleration state, compared to a catalyst system including Pt—Pd.
Figure 7:
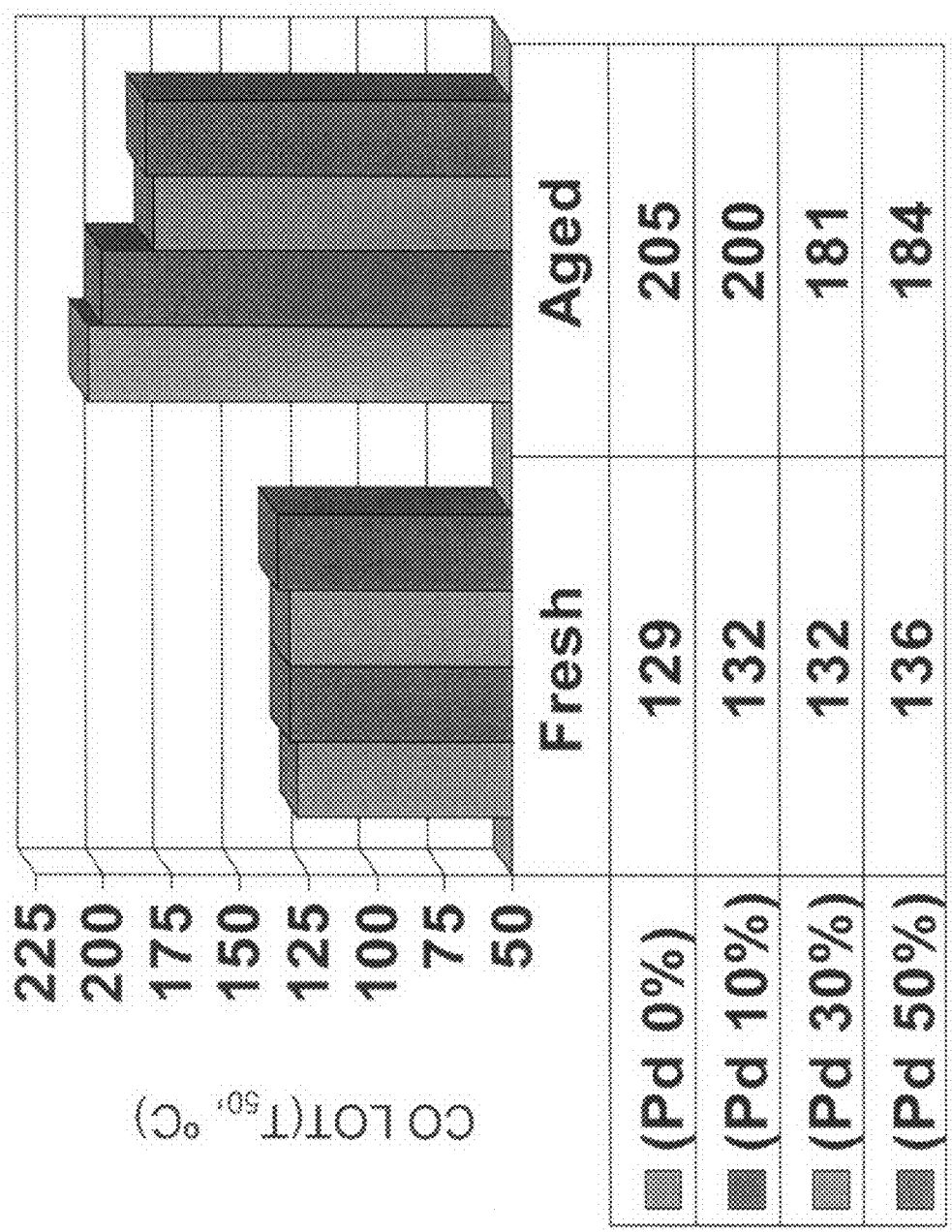
FIG. 7 is a graph showing the experimental result in which the thermal stability of a catalyst system is increased as the amount of palladium included in the catalyst system is increased.

4) The experimental fact that a catalyst system including only platinum has a low conversion ratio of CO in an engine acceleration state, compared to a catalyst system including Pt—Pd (shown in FIG. 6) and 5) The experimental observation that the thermal stability of a catalyst system is increased as the amount of palladium included in the catalyst system is increased (shown in FIG. 7).

In the three-layered catalyst system designed according to the present invention, a first layer (lower layer) actively participates in the oxidation of CO in an atmosphere of low-concentration CO, a second layer (intermediate layer) contributes to the oxidation of CO in an atmosphere of high-concentration CO, and a third layer (upper layer) serves to oxidize HC and trap HC. Therefore, it is inferred that the three-layered catalyst system exhibits improved efficiency of HC and CO purification even in an atmosphere of low exhaust gas.

The present invention provides a method of manufacturing a three-layered catalyst system.

Specifically, the method of manufacturing a three-layered catalyst system includes the steps of 1) providing a ceramic substrate, 2) wash-coating a first layer, a second layer and a third layer on the ceramic substrate, and 3) drying and immobilizing the wash-coated layers.

A catalyst of the present invention has a monolith honeycomb structure. The substrate is selected from the group consisting of cordierite, a -alumina and mullite. Preferably, cordierite may be used as the substrate.

Platinum and/or palladium are used as the precious metal component of each of the layers. In order to wash-coat the layers, a process of milling each mixed composition to a size of 8~10 μm using a pulverizer is required. The step of drying the wash-coated layers is performed at a temperature of 120~150° C. for 3~5 hours. Further, the step of immobilizing the dried catalyst composition after the step of wash-coating is generally performed using a baking method, but may be performed using various method commonly known in the related field.

Hereinafter, the present invention will be described in more detail with reference to Examples. These Examples are disclosed for illustrative purposes, and the scope of the present invention is not limited to these Examples. Those skilled in the art will appreciate that various modifications, additions and substitutions are possible, without departing from the scope and spirit of the invention as disclosed in the accompanying claims.

EXAMPLE 1

Manufacture of a Three-Layered Catalyst System Including a First Layer Containing 40% Platinum, a Second Layer Containing 100% Palladium, and a Third Layer Containing 60% Platinum First Step: Preparation of First Layer (Lower Layer)

1237 g of active alumina was dispersed in 1980 g of distilled water, and then put into an aqueous platinum solution. Subsequently, the mixed solution was stirred for 1 hour, 268 g of cerium-zirconium composite oxide, 119 g of acetic acid and 119 g of distilled water were added thereto, and the mixed solution was then stirred for 1 hour. Then, 923 g of octanol, which is an antifoaming agent for removing foam, was mixed into the mixed solution, and then the mixed solution was adjusted such that it had a pH of 4, to form a mixed slurry. Subsequently, the mixed slurry was milled to a size of 8 μm using a pulverizer, applied on a cordierite honeycomb having a cell density of 400 cells/inch, dried at a temperature of 120° C. for 3 hours, and then baked at a temperature of 530° C. for about 2 hours, thereby preparing a first layer.

Second Step: Preparation of Second Layer (Intermediate Layer)

433 g of active alumina was dispersed in 1585 g of distilled water and then stirred. Subsequently, an aqueous palladium solution and 928 g of cerium-zirconium composite oxide were added into the alumina solution, 446 g of zirconium acetate and 98 g of distilled water were further added thereto, and then the mixed solution was stirred for 1 hour to form a mixed slurry. Subsequently, the mixed slurry was milled to a size of 8 μm using a pulverizer, and was then applied on the cordierite honeycomb coated with the first layer prepared in the first step. Then, the mixed slurry applied on the cordierite honeycomb was dried at a temperature of 120° C. for 3 hours, and then baked at a temperature of 530° C. for about 2 hours, thereby preparing a second layer. The palladium component was adjusted such that the amount thereof was 40 g/l.

Third Step: Preparation of Third Layer (Upper Layer)

A third layer was prepared by performing the same processes as in the preparation of the first layer, except that the aqueous platinum solution was added such that 60% of platinum was included in the third layer, based on the total amount of platinum of 80 g/l.

EXAMPLE 2

Manufacture of a Three-Layered Catalyst System Including a First Layer Containing 20% Platinum, a Second Layer Containing 100% Palladium, and a Third Layer Containing 80% Platinum Each step of Example 2 was performed as in Example 1, except that the amount of platinum in the first and third layers was changed.

COMPARATIVE EXAMPLE 1

Manufacture of a Two-Layered Catalyst System Including a First Layer Containing 60% Platinum and 100% Palladium, and a Second Layer Containing 40% Platinum A two-layered catalyst system was manufactured in the above ratio using commonly-used methods of manufacturing a two-layered catalyst system.

Figure 8:
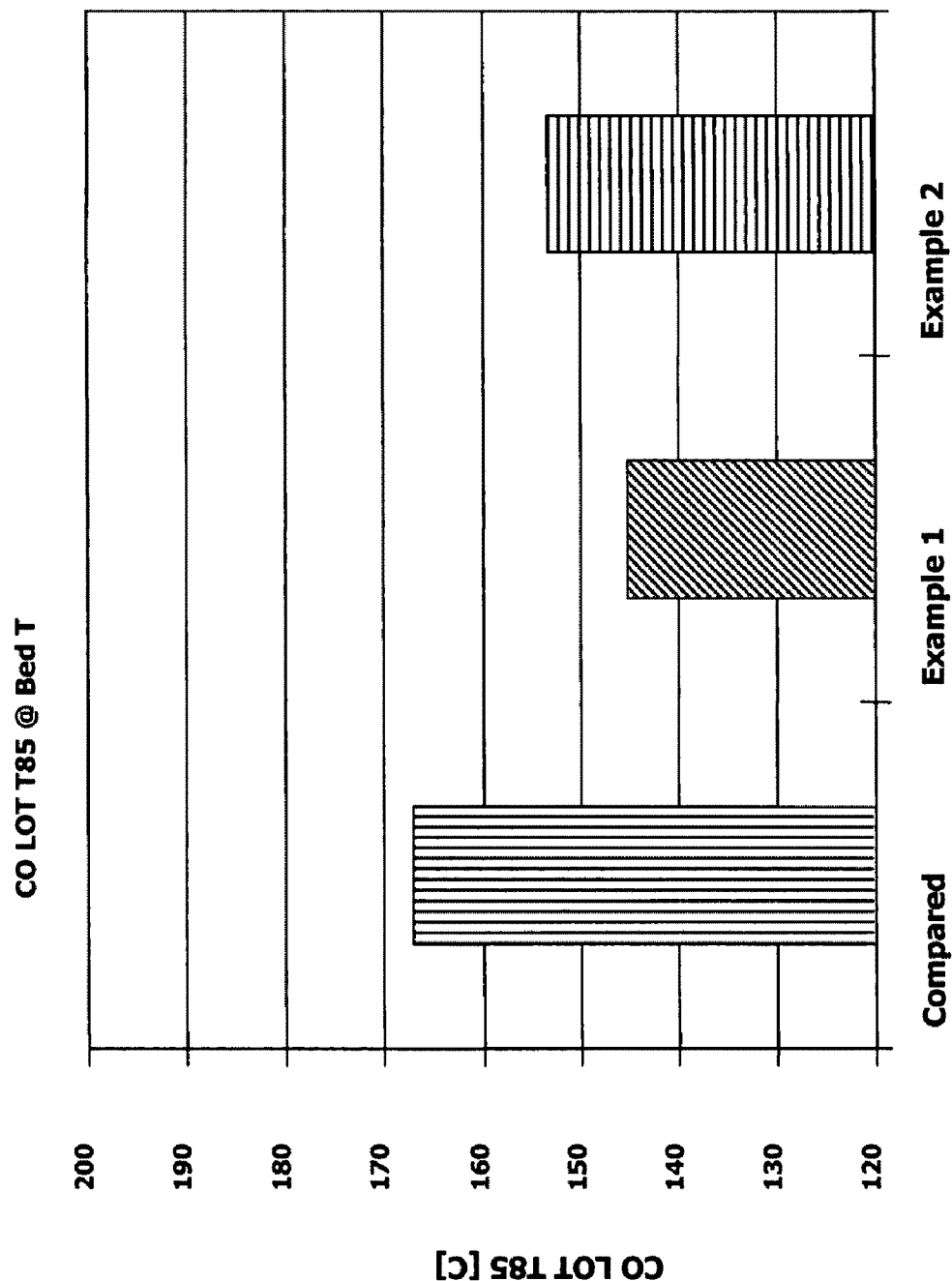
FIG. 8 is a graph showing the CO LOTs according to a three-layered catalyst system of the present invention and a conventional two-layered catalyst system.
Figure 9:
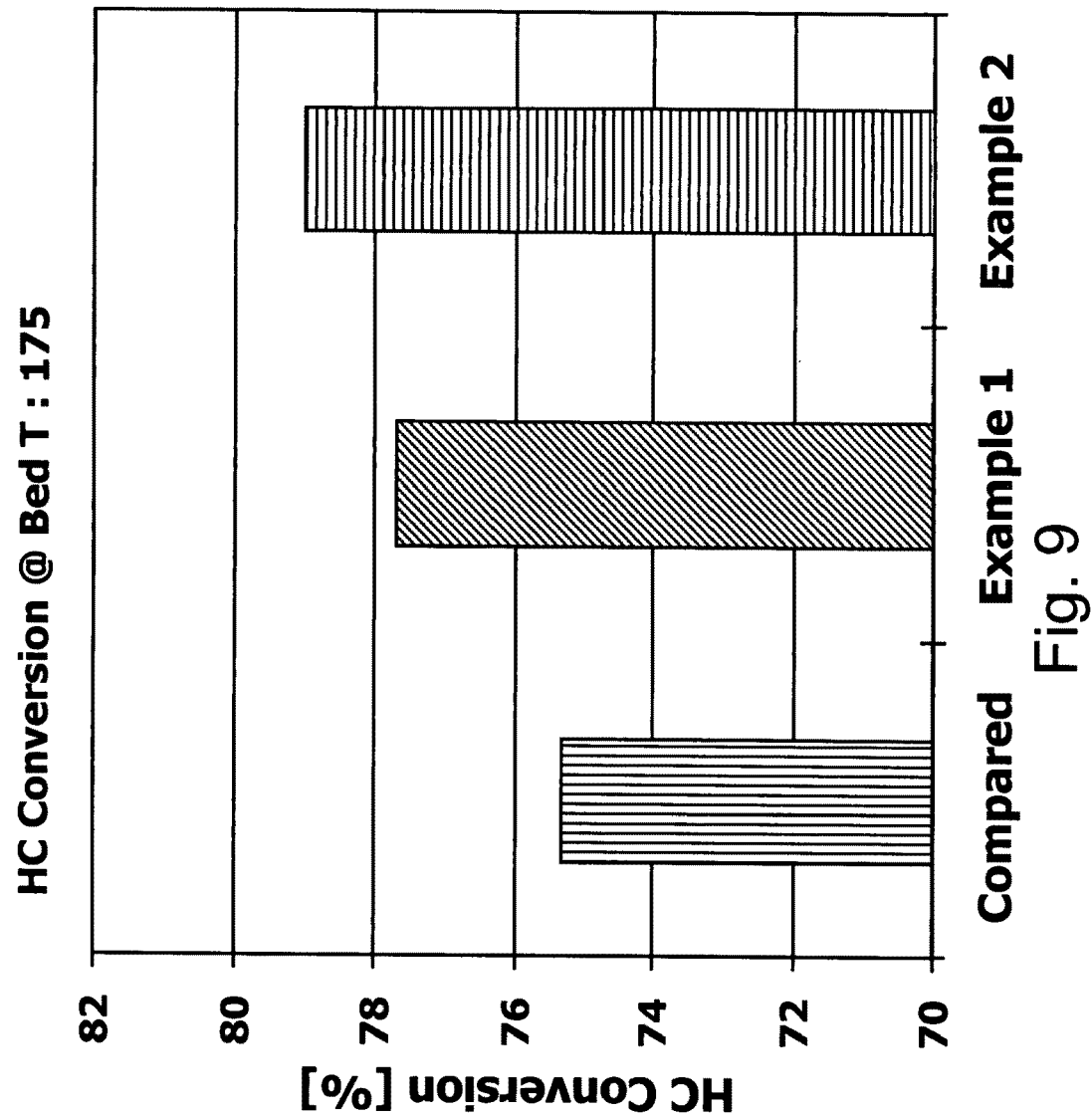
FIG. 9 is a graph showing the conversion ratios of HC according to the three-layered catalyst system of the present invention and a conventional two-layered catalyst system.

The manufactured catalyst system was aged at a temperature of 750° C. for 10 hours, and was then engine-tested. The results thereof were shown in FIG. 8 (CO LOT) and FIG. 9 (HC conversion ratio).

From the results, the three-layered catalyst system of the present invention shows remarkably improved results in CO LOT and HC conversion ratio, compared to the conventional two-layered catalyst system of Comparative Example 1.

As describe above, the present invention provides a three-layered catalyst system in which layers including predetermined precious metal components are sequentially layered on a substrate, and thus the conversion ratio of HC and CO is increased, thereby improving purification efficiency. Further, the present invention provide a useful catalyst which can be used for a catalyst system meeting Euro-5 regulations, in which it is expected that the temperature of exhaust gases will be decreased and highly-concentrated CO and HC will be discharged.

What is claimed is:

1. A three-layered diesel oxidation catalyst (DOC) system for purifying exhaust gases of an internal combustion engine, comprising:
   a substrate;
   a lower layer including a precious metal component of only platinum;
   an intermediate layer including a precious metal component of only palladium; and
   an upper layer including a precious metal component of only platinum, all of which are sequentially layered.

2. The three-layered catalyst system according to claim 1, wherein the substrate is selected from the group consisting of cordierite, α-alumina, and mullite.

3. The three-layered catalyst system according to claim 1, wherein the platinum is distributed in a weight ratio ranging from 60:40 to 80:20 in the upper layer and lower layer.

* * * * *